(12) United States Patent
Yang et al.

(10) Patent No.: US 10,992,903 B1
(45) Date of Patent: Apr. 27, 2021

(54) SCREEN POSITIONING BASED ON DOMINANT USER CHARACTERISTIC DETERMINATION

(71) Applicant: Lenovo (Singapore) Pte. Ltd., Singapore (SG)

(72) Inventors: Zhenyu Yang, Morrisville, NC (US); Jianbang Zhang, Cary, NC (US); Song Wang, Cary, NC (US); Mengnan Wang, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/997,073

(22) Filed: Aug. 19, 2020

(51) Int. Cl.
*H04N 7/14* (2006.01)
*G10L 25/78* (2013.01)
*H04N 7/15* (2006.01)
*G06T 7/70* (2017.01)
*G06T 7/20* (2017.01)
*G06K 9/00* (2006.01)

(52) U.S. Cl.
CPC ......... *H04N 7/142* (2013.01); *G06K 9/00228* (2013.01); *G06T 7/20* (2013.01); *G06T 7/70* (2017.01); *G10L 25/78* (2013.01); *H04N 7/15* (2013.01); *G06T 2207/30201* (2013.01)

(58) Field of Classification Search
CPC . H04N 7/14; H04N 7/15; G10L 25/78; G06K 9/00; G06T 7/70; G06T 7/20
USPC ............................................ 348/14.01–14.16
See application file for complete search history.

(56) References Cited

U.S. PATENT DOCUMENTS

| | | | | |
|---|---|---|---|---|
| 2004/0179714 A1* | 9/2004 | Jouppi | .................. | H04N 7/144 382/103 |
| 2005/0219356 A1* | 10/2005 | Smith | ................ | A47B 21/0073 348/14.05 |
| 2010/0315481 A1* | 12/2010 | Wijngaarden | .......... | H04N 7/142 348/14.07 |
| 2013/0229483 A1* | 9/2013 | Venolia | .................. | H04N 7/147 348/14.08 |

\* cited by examiner

*Primary Examiner* — Melur Ramakrishnaiah
(74) *Attorney, Agent, or Firm* — VanLeeuwen & VanLeeuwen; Jason A. Friday

(57) ABSTRACT

An approach is provided in which the approach initiates a video conference between a set of local users in a physical area conversing on a display with one or more remote users. The approach selects a first one of the set of local users based on analyzing a set of user characteristics corresponding to the set of local users and positions the display based on a location of the first local user in the physical area.

20 Claims, 8 Drawing Sheets

SCREEN POSITIONING BASED ON DOMINANT USER CHARACTERISTIC DETERMINATION

BACKGROUND

The advancement of network technology and personal device technology has caused an exponential growth in video conferencing. Video conferencing systems allow users to conduct live audio/video discussions for meetings, training events, lectures, presentations, or personal conversations using web-connected devices. Users conduct live video conferences using common devices having a microphone, a camera, and a display, such as a desktop computer, a laptop computer, a smart phone, and etcetera.

In many video conferencing sessions, a user is not constantly confined to the same space and does not exhibit the same posture over time. When a user physically moves around a room, the user may have difficulty viewing a display and is required to manually adjust the display to the user's preferred viewing angle. Likewise, during a video conference with multiple users in a single room sharing a single display, complications arise on positioning the display to achieve an optimum viewing angle for the multiple users.

BRIEF SUMMARY

According to one embodiment of the present disclosure, an approach is provided in which the approach initiates a video conference between a set of local users in a physical area conversing on a display with one or more remote users. The approach selects a first one of the set of local users based on analyzing a set of user characteristics corresponding to the set of local users and positions the display based on a location of the first local user in the physical area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
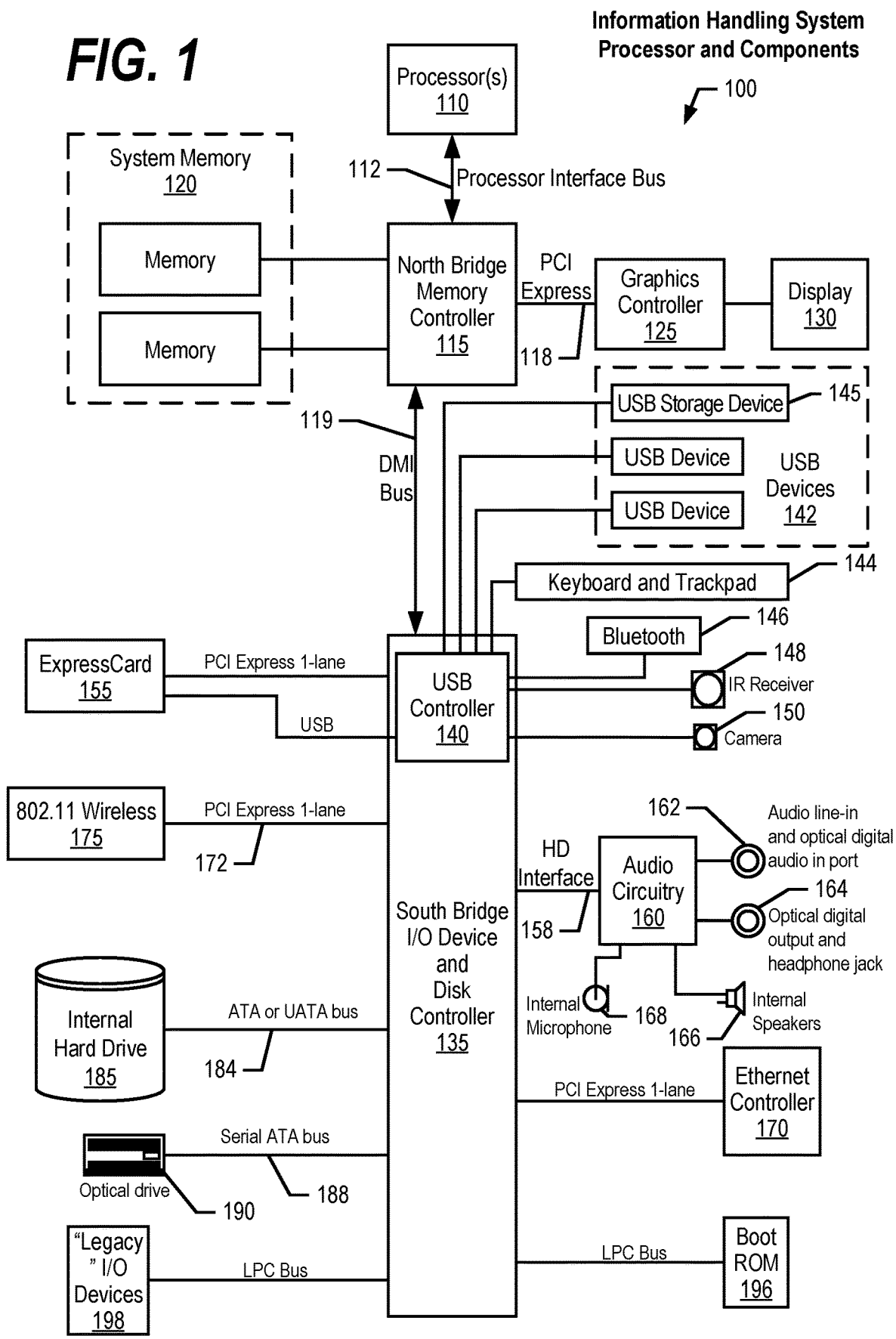
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects lowbandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
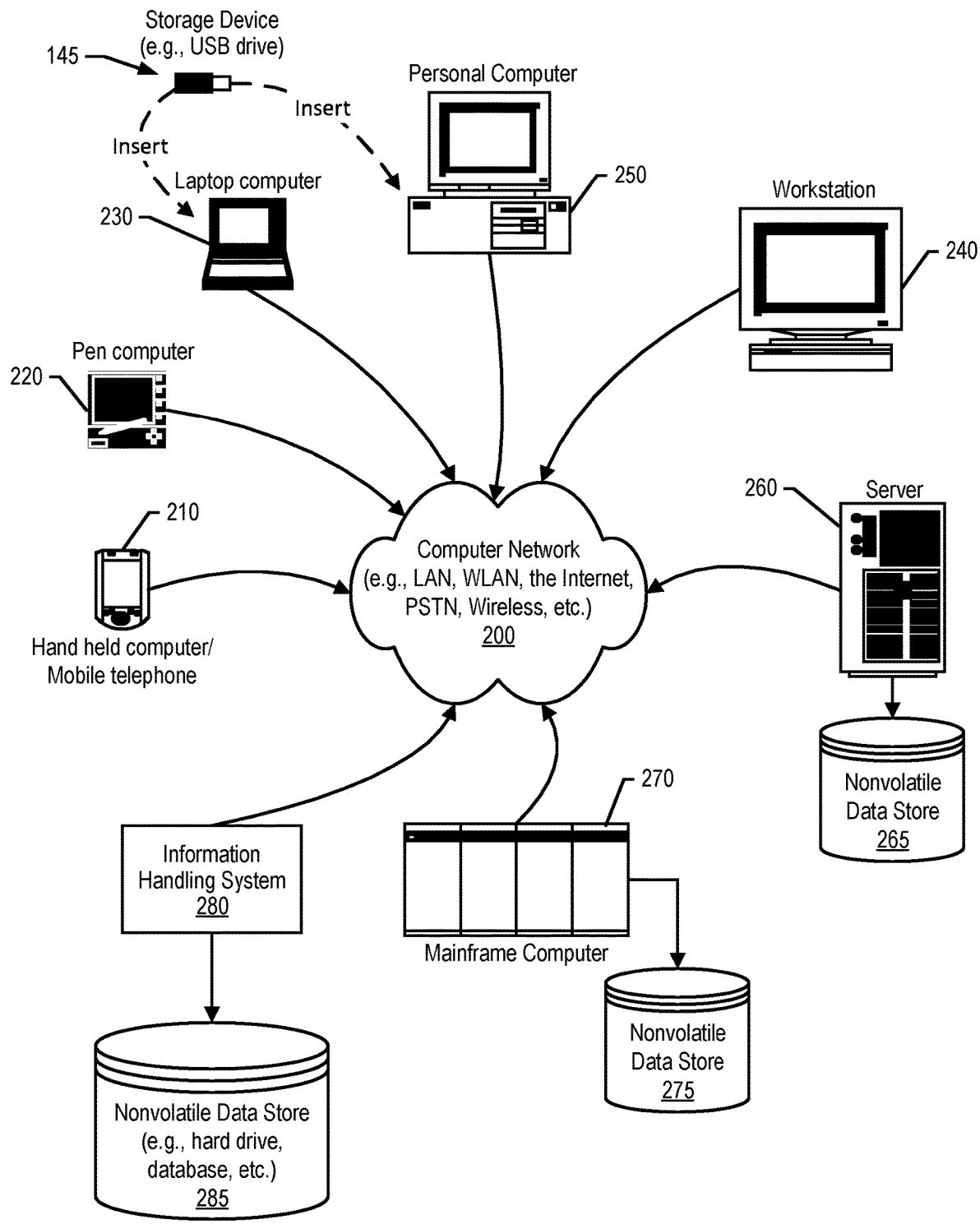
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, in many video conferencing situations, a user is not constantly confined to the same space and does not exhibit the same posture over time. When a user physically moves around a room, the user may have difficulty viewing a display screen (referred to herein as "display") and manually adjusts the display to achieve the user's preferred viewing angle. Likewise, during a video conference with many users in a single room sharing a single display, complications arise on how to position the display to achieve an optimum viewing angle. FIGS. 3 through 8 depict an approach that can be executed on an information handling system that uses face detection, face pose estimation and voice analysis to identify a dominant user (e.g., active speaker) and rotate the display based on the dominant user's movements during the video conference while the dominant user views a video feed of a remote user on a display. The approach uses a camera, microphone, and processing unit that executes software algorithms for facial and voice detection/recognition and connected robotic arm/motorized hardware that allows display movement and position adjustment.

Figure 3:
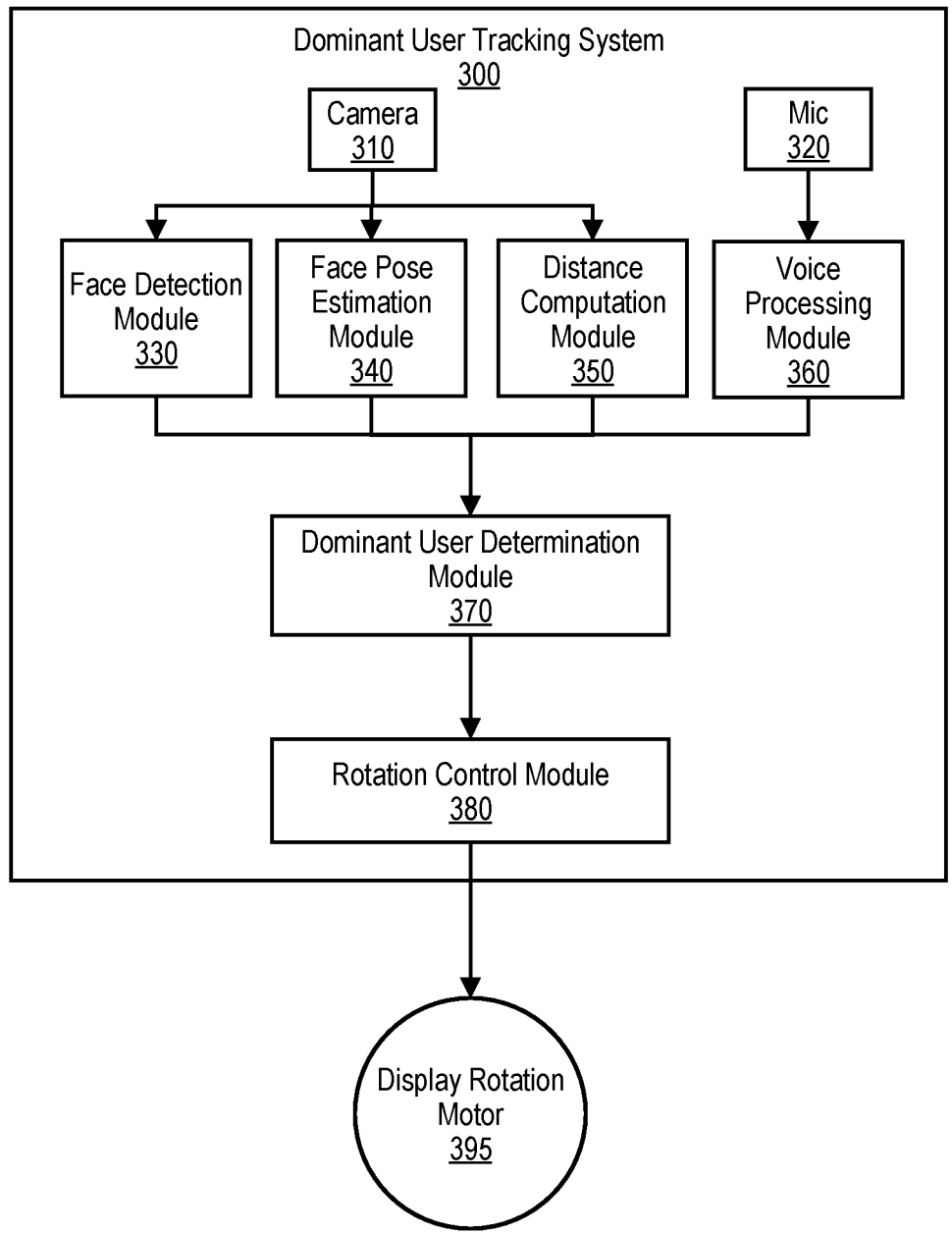
FIG. 3 depicts a high-level diagram of a dominant user tracking system.

FIG. 3 depicts a high-level diagram of a dominant user tracking system. Dominant user tracking system 300 includes camera 310 and microphone 320 that captures visual and audible information of local users in proximity (e.g., users in a room). Camera 310's output feeds into face detection module 330, face pose estimation module 340, and distance computation module 350. In one embodiment, dominant user tracking system 300 uses modern computer vision and deep learning technologies to detect human faces (face detection module 330) and estimates the pose of the face (face pose estimation module 350). In this embodiment, by detecting the face pose of the local user, dominant user tracking system 300 calculates the relevant position of the computer screen to the user. For example, if dominant user tracking system 300 detects a user's face to be straight and facing towards a display, dominant user tracking system 300 rotates the display right in front of the user's face and provides an initial positioning of the display and indications on how the display should rotate while the user moves.

In one embodiment, dominant user tracking system 300 determines a bounding box around a user's face and determines a distance of the user relative to the display (distance computation module 350), while dominant user tracking system 300 uses the pose estimation to adapt the position of the display. In this embodiment, dominant user tracking system 300 trains both face detection module 330 and face pose estimation module 340 to perform at a high degree of accuracy. In another embodiment, a user specifies a preferred viewing angle and configures dominant user tracking system 300 to rotate a display via display rotation motor 395 based on the dominant user's movements to maintain the preferred viewing angle (see FIGS. 4, 6, and corresponding text for further details).

In a multi-user scenario, dominant user determination module 370 receives outputs from face detection module 330, face pose estimation module 340, distance computation module 350, and voice processing module 360 and uses the information to select a dominant user. Dominant user tracking system 300 uses the same facial recognition and tracking mechanism to determine the distance of each user's face, with the addition of analyzing the strength of each user's voice as a basis for determining which user should be selected as the dominant user. For example, if one user's face is closer to the display compared to the other users and has the loudest voice, dominant user determination module 370 selects the user as the dominant user and rotates the display based on the dominant user's movements (see FIGS. 5, 8, and corresponding text for further details).

Dominant user determination module 370 sends information to rotation control module 380 based on the selected dominant user's movements, which rotation control module 380 uses display rotation motor 395 to rotate a display as discussed herein (up, down, left, right).

In one embodiment, in a multi-user scenario, dominant user tracking system 300 sets a threshold based on a percentage of the faces detected in the area via face detection module 330 and the volume of voices detected via voice processing module 360 from a recognized dataset of users to handle situations where none of the users are in clear view and/or are coherently heard, such as during a gathering where users are conversing with each other and not facing the display. In this embodiment, dominant user tracking system 300 rotates the display to a default position or to a direction/location of the last known dominant user until signal qualities of the users improve from face recognition and/or voice processing (see FIG. 8 and corresponding text for further details).

Figure 7:
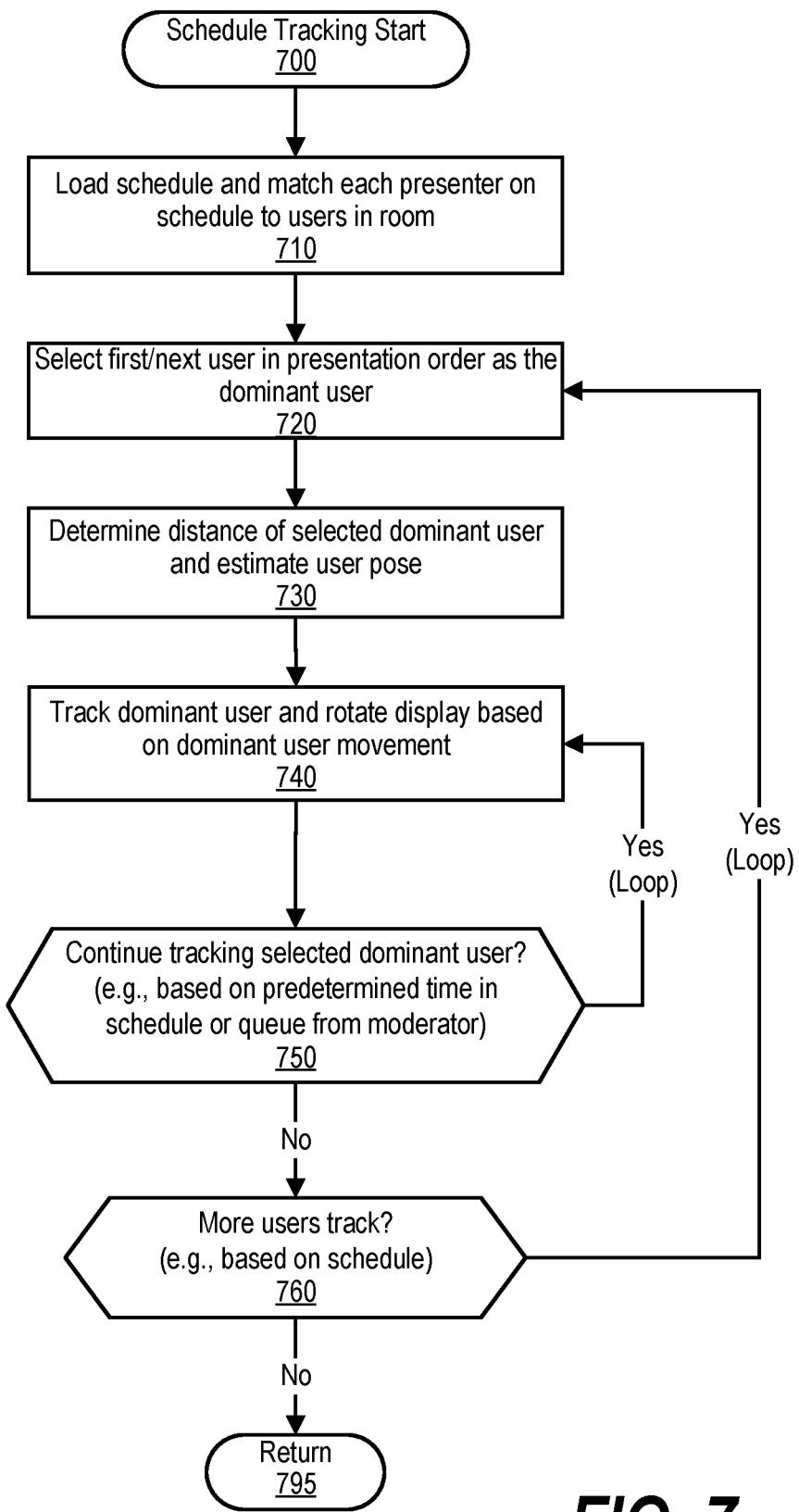
FIG. 7 depicts a flowchart showing steps taken to select and track a dominant user based on a predetermined schedule and change to a different dominant user based on the predetermined schedule.

In another embodiment, dominant user tracking system 300 uses scheduling information in scenarios where multiple users are scheduled to be dominant users, such as during a presentation where each user is allotted a certain amount of time (see FIG. 7 and corresponding text for further details). In this embodiment, the scheduling information is passed to dominant user determination module 370 to select and track a dominant user based on the predetermined schedule. For example, if user A is scheduled to be a first presenter, dominant user tracking system 300 detects user A's face and/or voice and rotates the display based on user A's position/movements even if other users' faces/voices become more dominant. Continuing with the example, when user A's allotted presentation time is complete, dominant user tracking system 300 identifies the next presenter 'user B' and rotates the display to user B and rotates the display based on user B's movement even if other users' faces/voices become more dominant.

Figure 4:
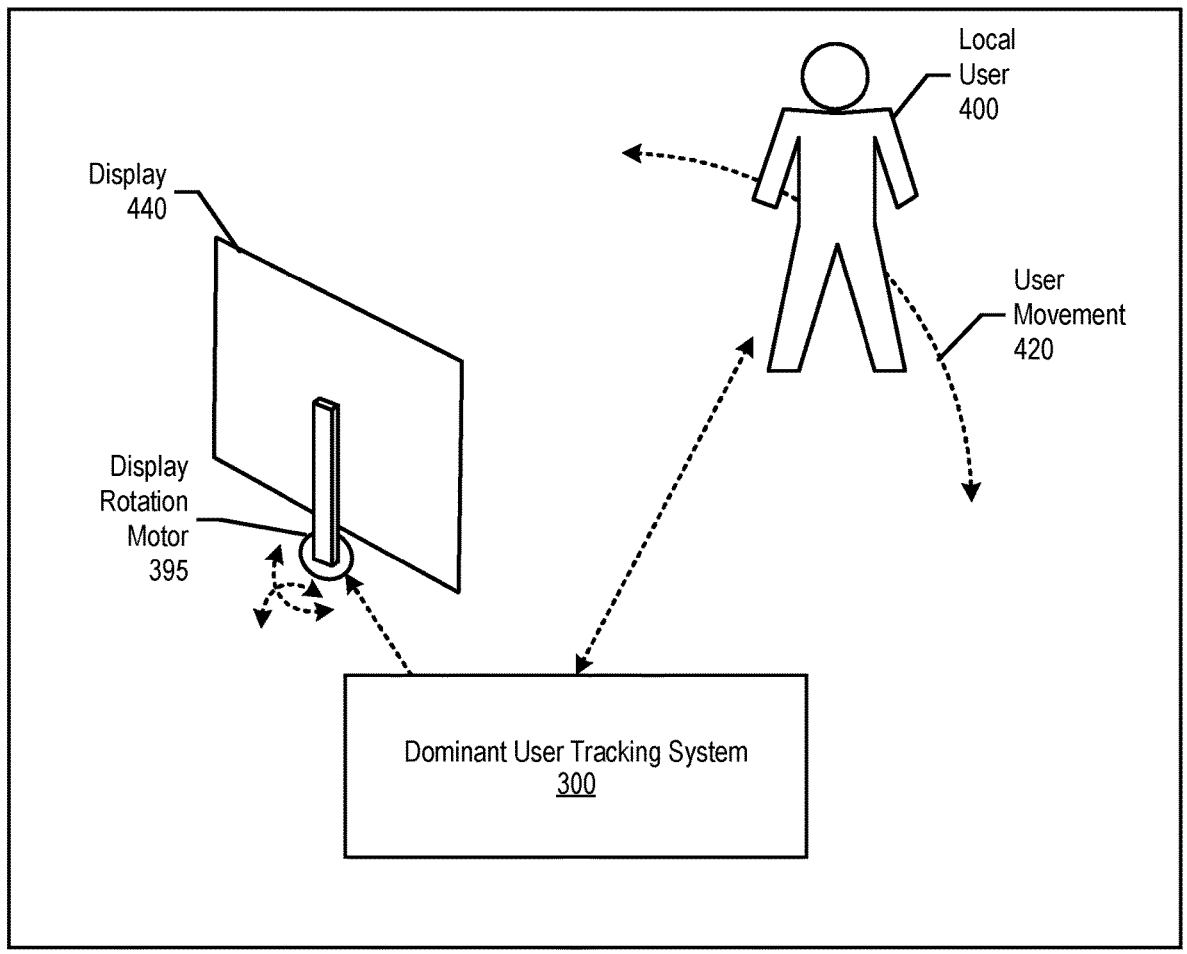
FIG. 4 depicts a diagram of a single user session with a dominant user tracking system.

FIG. 4 depicts a diagram of a single user session with dominant user tracking system 300. Dominant user tracking system 300 determines that a local user 400 is in a room and configures itself for a single user session. Dominant user tracking system 300 performs initial steps of determining a distance of user 400 from display 440 and local user 400's pose. Dominant user tracking system 300 also sets a preferred viewing angle of local user 400, which may be a head-on view of display 440 or slightly offset to account for screen glare (see FIG. 6 and corresponding text for further details).

Then, dominant user tracking system 300 tracks local user 400's movement 420 and instructs rotation motor 395 to rotate display 440 based on movement 420. User movement 420 includes moving around a room and/or standing/sitting. In one embodiment, dominant user tracking system 300 also instructs separate cameras and/or microphones to rotate similarly based on user movements 420 to best capture video and audio of local user 400.

Figure 5:
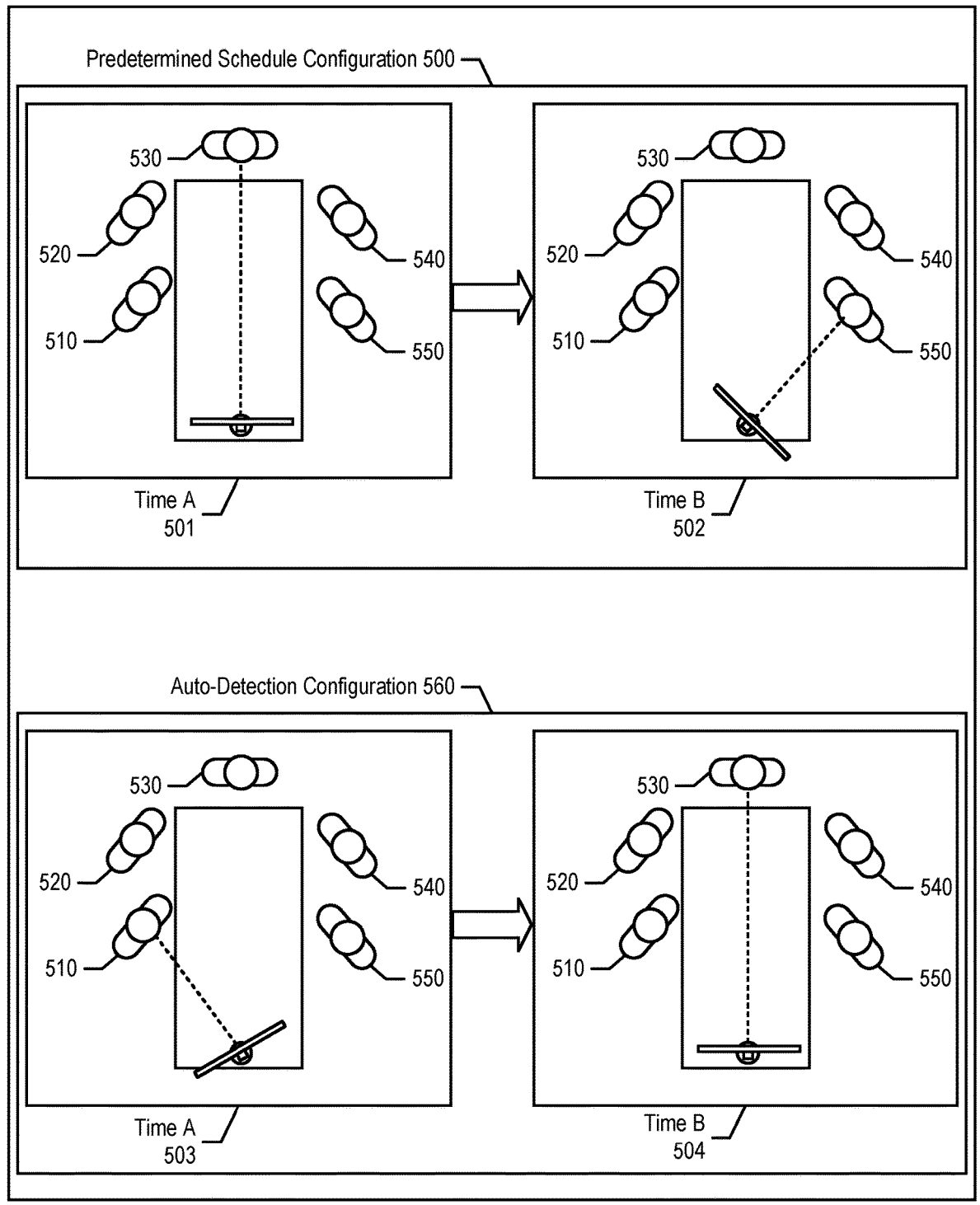
FIG. 5 depicts a diagram of selecting and tracking different dominant users during a multi-user video conference.

FIG. 5 depicts a diagram of selecting and tracking different dominant users during a multi-user video conference. FIG. 5 shows multi-user video conference sessions with local users 510, 520, 530, 540, and 550 in a conference room. FIG. 5 shows examples of both a predetermined schedule configuration 500 and auto-detection configuration 560.

During predetermined schedule configuration 500, dominant user tracking system 300 retrieves a schedule and identifies a presentation order of local users 510, 520, 530, 540, and 550. In one embodiment, dominant user tracking system 300 performs facial recognition/audio analysis and matches local users 510, 520, 530, 540, and 550 to a database to identify local users 510, 520, 530, 540, and 550. Dominant user tracking system 300 then matches their identity with names on the predetermined schedule to determine which user should present.

FIG. 5 shows that at "Time A 501" user 530 is selected as the dominant user, such as to give introductory remarks during a presentation. During "Time A 501," dominant user tracking system 300 tracks user 530's movements and rotates display 440 based on user 530's movements as discussed herein accordingly. At "Time B 502," dominant user tracking system 300 selects user 550 as the dominant user based on the predetermined schedule. During "Time B 502," dominant user tracking system 300 tracks user 550's movements and rotates display 440 as discussed herein accordingly (see FIG. 7 and corresponding text for further details).

Figure 8:
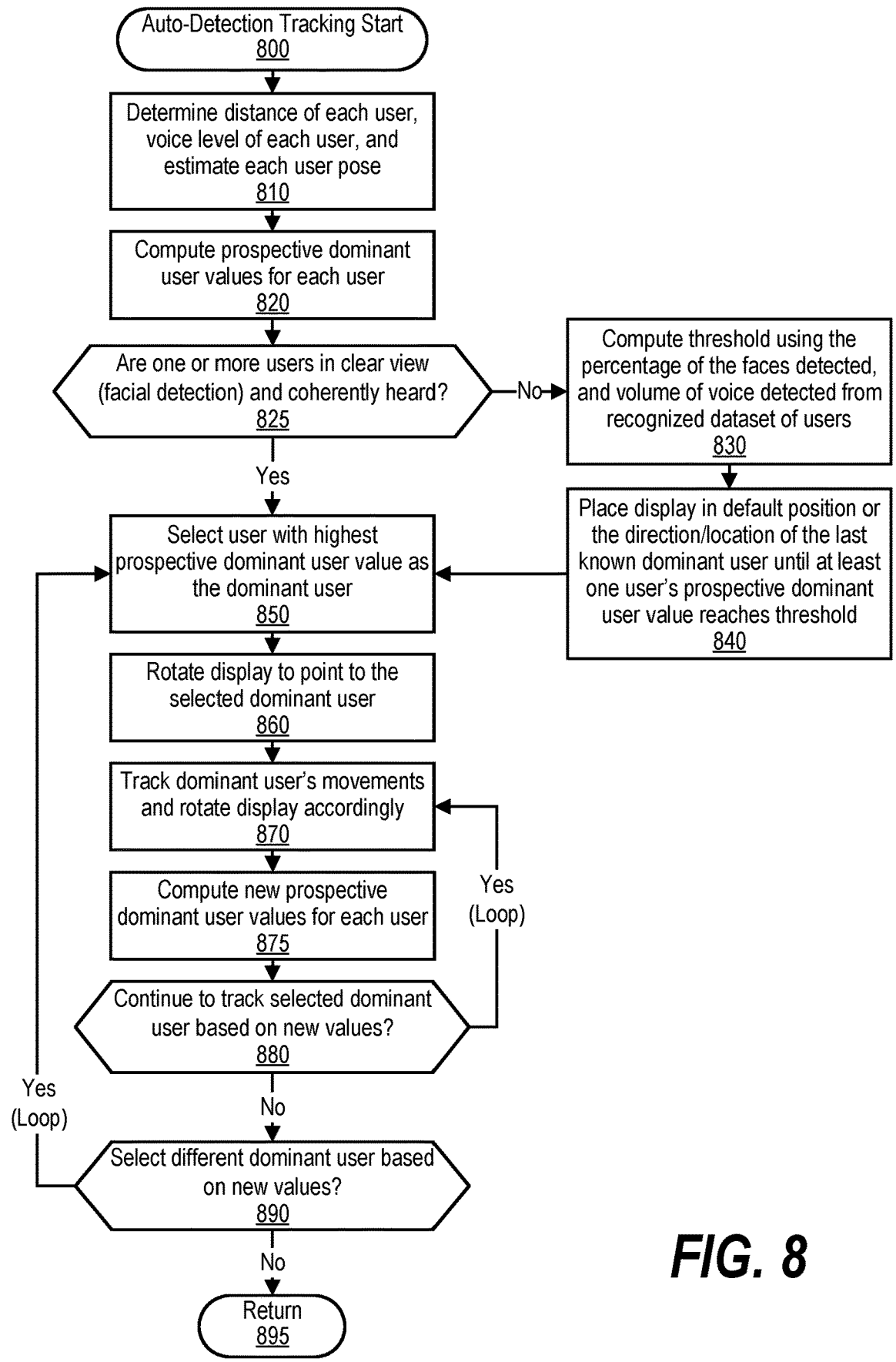
FIG. 8 depicts a flowchart showing steps taken to automatically select and track a dominant user based on relative voice analysis and distance measurements.

Referring to auto-detection configuration 500, dominant user tracking system 300 analyzes each of users 510, 520, 530, 540, and 550 distances to display 440 and users 510, 520, 530, 540, and 550 audible characteristics to select a dominant user (see FIG. 8 and corresponding text for further details). FIG. 5 shows that during "Time A 503" user 510 is selected as the dominant user. As such, dominant user tracking system 300 tracks user 510's movements and rotates display 440 during "Time A 503" accordingly. At "Time B 504," dominant user tracking system 300 selects user 530 as the dominant user based on distance/voice computations as discussed herein. For example, dominant user tracking system 300 may detect that user 530 takes over the conversation based on user 530's voice level. As such, dominant user tracking system 300 tracks user 530's movements and rotates display 440 during "Time B 504" accordingly.

Figure 6:
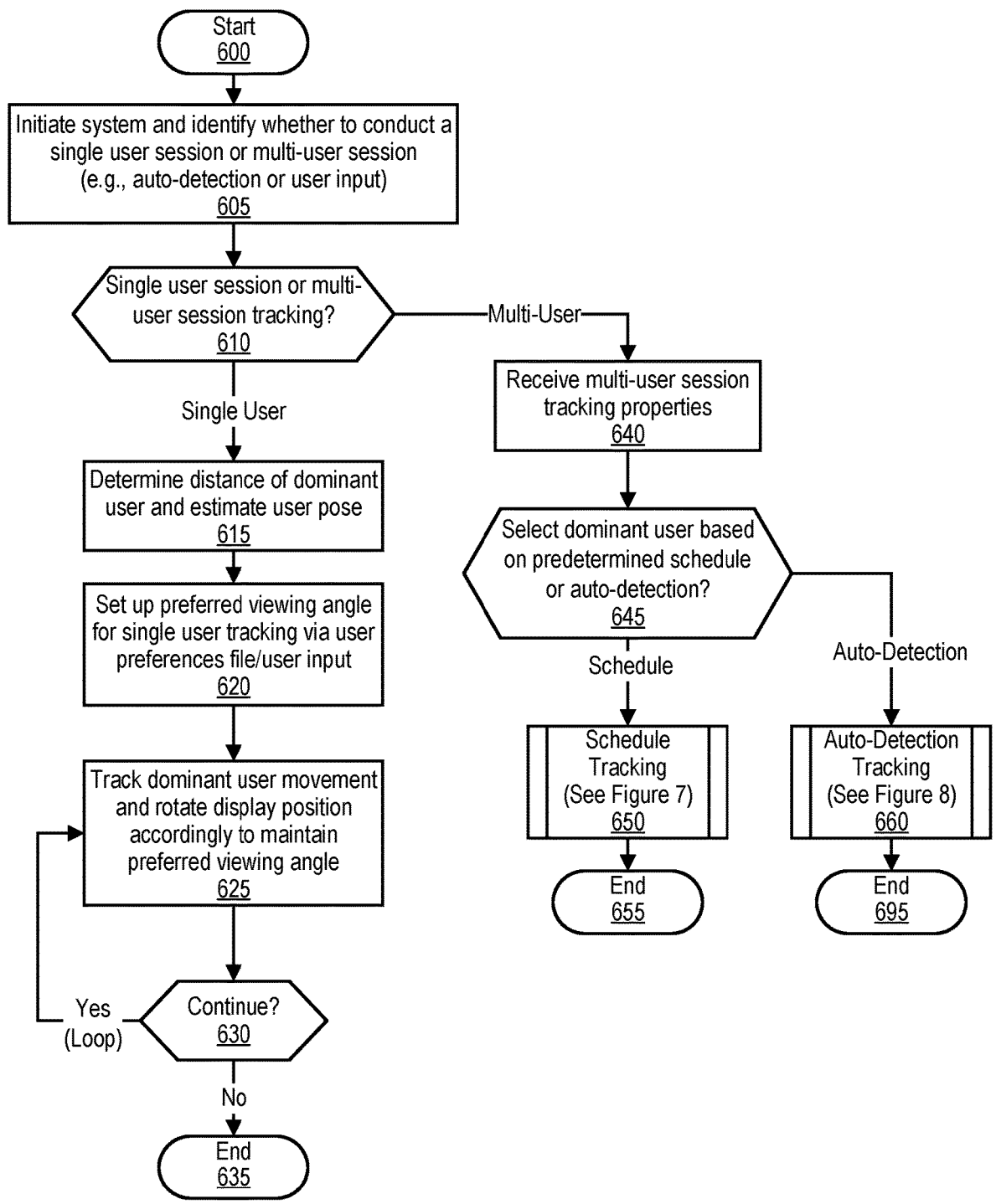
FIG. 6 depicts a flowchart showing steps taken to select and track a dominant user.

FIG. 6 depicts a flowchart showing steps taken to select and track a dominant user. FIG. 6 processing commences at 600 whereupon, at step 605, the process initiates dominant user tracking system 300 and identifies whether to conduct a single local user session or a multiple local user session. In one embodiment, the process detects the number of local users in a room and determines whether a single user or multiple users are in the room. In another embodiment, the process receives an indication through a user via a user interface on whether to conduct a single user session or a multiple local user session.

The process determines as to whether to perform single user session tracking or a multiple local user session tracking (decision 610). If the process should conduct a single user session tracking, then decision 610 branches to the 'single user' branch whereupon, at step 615, the process determines a distance of the single user (selected as the dominant user) and estimates the dominant user pose (e.g., looking left, looking right, etc.).

At step 620, the process sets up a preferred viewing angle for single user tracking via user preferences file/user input. For example, the user may wish to have the display slightly offset to reduce glare from overhead lights or sunlight entering through windows.

At step 625, the process tracks the dominant user's movement and rotates the display position (left, right, up, down) accordingly to maintain the preferred viewing angle (see FIG. 4 and corresponding text for further details). In one embodiment, the process also rotates a camera and microphone that may be separate from the display consistent with the dominant user's movements.

The process determines as to whether to continue tracking the dominant user (decision 630). If the process should continue, then decision 630 branches to the 'yes' branch which loops back to continue to track the dominant user and rotate the display accordingly. This looping continues until the process should terminate, such as when the video conference terminates, at which point decision 630 branches to the 'no' branch exiting the loop. FIG. 6 processing thereafter ends at 635.

Referring back to decision 610, if the process should conduct a multiple local user session, then decision 610 branches to the 'multi-user' branch. At step 640, the process receives multi-user session tracking properties, such as from a user interface, that indicate whether to select dominate users based on a predetermined schedule or based on dominant user auto-detection steps discussed herein. For example, if the users are conducting a presentation with a predetermined order and/or timeslots, the process configures dominant user tracking system 300 to follow the predetermined order. The process determines as to whether to select a dominant user based on a predetermined schedule or through auto-detection (decision 645).

If the process should identify a dominant user based on a predetermined schedule, then decision 645 branches to the 'Schedule' branch whereupon, at predefined process 650, the process selects a dominate user based on the predetermined schedule and tracks the dominate user until a different user is scheduled to present (see FIG. 7 and corresponding text for processing details). FIG. 6 processing thereafter ends at 655.

On the other hand, if the process should use dominant user auto-detection to select a dominant user from the multiple users, then decision 645 branches to the 'Auto-Detection' branch whereupon, at predefined process 660, the process selects a dominant user based on distance/voice computations and rotates the display based on the dominant user's movements until a different dominant user is selected based on new distance/voice computations (see FIG. 8 and corresponding text for processing details). FIG. 6 processing thereafter ends at 695.

FIG. 7 depicts a flowchart showing steps taken to select and track a dominant user based on a predetermined schedule and change to a different dominant user based on the predetermined schedule. FIG. 7 processing commences at 700 whereupon, at step 710, the process loads a schedule (e.g., presentation schedule) and matches each presenter on the schedule to the users in room. In one embodiment, the process retrieves facial recognition information from a storage area, matches the facial recognition information to the users in the room to identify their names, and then matches the names to the presenters on the schedule. In another embodiment, the process performs a "roll call" and identifies which users respond to which names.

At step 720, the process selects the first user on the schedule as the dominant user and, at step 730, the process determines a distance of the dominant user from the display and estimates the user pose as discussed previously. At step 740, the process tracks the dominant user's movements and rotates the display based on the dominant user's movement. For example, the process may rotate the display upwards when the dominant user stands, and may rotate the display left/right as the dominant user walks around the room. As discussed earlier, the process may also rotate a separate camera(s) and/or microphone(s) accordingly based on the dominant user's movements.

The process determines as to whether to continue tracking the selected dominant user, such as until the schedule indicates a different presenter (decision 750). If the process should continue tracking the selected dominant user, then decision 750 branches to the 'yes' branch which loops back to continue tracking the selected dominant user. This looping continues until the process should terminate tracking the selected dominant user, at which point decision 750 branches to the 'no' branch exiting the loop.

The process determines as to whether there are more users track, such as the next presenter indicated by the predetermined schedule (decision 760). If there are more users track, then decision 760 branches to the 'yes' branch, which loops back to select the next dominant user to track, rotate the display to the next dominant user, and begin rotating the display based on the next dominant user's movements. This looping continues until there are no more dominant users to track (e.g., end of presentation), at which point decision 760 branches to the 'no' branch exiting the loop. FIG. 7 processing thereafter returns to the calling routine (see FIG. 6) at 795.

FIG. 8 depicts a flowchart showing steps taken to automatically select and track a dominant user based on relative voice analysis and distance measurements. FIG. 8 processing commences at 800 whereupon, at step 810, the process determines a distance of each user to display 440, a voice level of each user, and estimates each user pose as discussed herein. At step 820, the process computes a prospective dominant user value for each user based on each user's distance measurement, voice level, and possibly user pose. In one embodiment, the process tracks the active speaker as the dominate user.

The process determines as to whether there are one or more users in clear view (facial detection) and coherently heard (decision 825). For example, the room may include multiple people conversing with each other and facing away from the display. In this example, the process determines if one or more users are actually facing the display and are speaking at a detectable level. If there are one or more users in clear view and coherently heard, then decision 825 branches to the 'yes' branch whereupon, at step 850, the process selects, from the users in clear view and coherently heard, the user with the highest prospective dominant user value as the dominant user.

On the other hand, if there is not at least one user that is in clear view and coherently heard (e.g. all users are facing away from display), then decision 825 branches to the 'no' branch whereupon, at step 830, the process computes a threshold using the percentage of the faces detected, and volume of voice detected from recognized dataset of users. For example, the process generates rating scores of each user's percentage to be the dominate user, according to facts, such as whether a user is trying view the display, the activity of the user (if the user is talking) and the user's voice level. At step 840, the process places the display in a default position or a direction/location of the last known dominant user until at least one user's prospective dominant user value reaches the threshold, at which point the process proceeds to step 850.

At step 860, the process rotates the display to the selected dominant user and, at step 870, the process tracks the dominant user's movements and rotates the display accordingly as discussed herein (e.g., up, down, left, right).

At step 875, the process routinely computes new prospective dominant user values for each user to detect whether a different user should be selected as the dominant user. For example, the first user may give their opinion on a business merger and a different user in the room may give their opinion once the first user finishes speaking.

The process determines as to whether to continue to track the selected dominant user based on the new prospective dominant user values (decision 880). If the process should continue to track the selected dominant user, then decision 880 branches to the 'yes' branch which loops back to continue to track the dominant user and rotate the display according to the dominant user's movements. This looping continues until the selected dominant user's new prospective dominant user value is no longer the highest value, at which point decision 880 branches to the 'no' branch exiting the loop.

The process determines as to whether to select a different dominant user based on the new prospective dominant user values (decision 890). For example, the meeting may adjourn and no new prospective dominant user value reaches the threshold discussed above. If the process should change and track a different dominant user, then decision 890 branches to the 'yes' branch which loops back to select a different user with a highest new prospective dominant user value. This looping continues until the process should terminate (e.g., end of meeting), at which point decision 890 branches to the 'no' branch exiting the loop. FIG. 8 processing thereafter returns to the calling routine (see FIG. 6) at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   initiating a video conference between a set of local users and one or more remote users, wherein the set of local users is located in a physical area and views one or more video feeds of the one or more remote users on a display;
   identifying a distance from the display to each one of the set of local users, resulting in a set of distances;
   determining a voice level of each one of the set of local users, resulting in a set of voice levels;
   computing a set of prospective dominant user values for each of the set of local users based on their corresponding one of the set of distances and one of the set of voice levels;
   selecting a first one of the set of local users based on the set of prospective dominant user values; and
   positioning the display based on a location of the first local user in the physical area.

2. The method of claim 1 further comprising:
   detecting a change in the location of the first local user in the physical area; and
   rotating the display based on the change in the location of the first local user.

3. The method of claim 2 further comprising:
   determining a preferred viewing angle of the display, wherein the preferred viewing angle is an angle at which the first local user prefers to view the display; and
   maintaining the preferred viewing angle to the first local user during the rotating of the display.

4. The method of claim 1 wherein the method further comprises:
   assigning the first local user as a dominant user in response to determining that the first local user has a highest one of the set of prospective dominant user values.

5. The method of claim 4 further comprising:
   computing a set of new prospective dominant user values for each of the set of local users based on a set of new distances and a set of new voice levels corresponding to the set of local users;
   assigning a second one of the set of local users as a new dominant user in response to determining that the second local user has a highest new prospective dominant user values; and
   rotating the display to the second local user.

6. The method of claim 4 further comprising:
in response to determining that the highest prospective dominant user value fails to be above a threshold:
rotating the display to a default position;
determining a percentage of faces of the set of local users that are visible from the display;
determining a percentage of voices of the set of users that are audible from the display;
computing a threshold based on the percentage of faces and the percentage of voices; and
maintaining the display in the default position until at least one of the set of prospective dominant user values reaches the threshold.

7. The method of claim 1 further comprising:
retrieving a predetermined schedule that comprises a set of presenters in a presentation order;
matching each of the set of local users to the set of presenters; and
determining that the first local user matches a first one of the set of presenters based on the presentation order.

8. The method of claim 7 further comprising:
receiving an indication to select a different one of the set of local users based on the predetermined schedule;
in response to receiving the indication to select the different user, identifying a second one of the set of local users that matches a second one of the set of presenters based on the presentation order; and
rotating the display to the second local user.

9. An information handling system comprising:
one or more processors;
a memory coupled to at least one of the processors;
a set of computer program instructions stored in the memory and executed by at least one of the processors in order to perform actions of:
initiating a video conference between a set of local users and one or more remote users, wherein the set of local users is located in a physical area and views one or more video feeds of the one or more remote users on a display;
identifying a distance from the display to each one of the set of local users, resulting in a set of distances;
determining a voice level of each one of the set of local users, resulting in a set of voice levels;
computing a set of prospective dominant user values for each of the set of local users based on their corresponding one of the set of distances and one of the set of voice levels;
selecting a first one of the set of local users based on the set of prospective dominant user values; and
positioning the display based on a location of the first local user in the physical area.

10. The information handling system of claim 8 wherein the processors perform additional actions comprising:
detecting a change in the location of the first local user in the physical area; and
rotating the display based on the change in the location of the first local user.

11. The information handling system of claim 10 wherein the processors perform additional actions comprising:
determining a preferred viewing angle of the display, wherein the preferred viewing angle is an angle at which the first local user prefers to view the display; and
maintaining the preferred viewing angle to the first local user during the rotating of the display.

12. The information handling system of claim 9 wherein the processors perform additional actions comprising:
assigning the first local user as a dominant user in response to determining that the first local user has a highest one of the set of prospective dominant user values.

13. The information handling system of claim 12 wherein the processors perform additional actions comprising:
computing a set of new prospective dominant user values for each of the set of local users based on a set of new distances and a set of new voice levels corresponding to the set of local users;
assigning a second one of the set of local users as a new dominant user in response to determining that the second local user has a highest new prospective dominant user values; and
rotating the display to the second local user.

14. The information handling system of claim 12 wherein the processors perform additional actions comprising:
in response to determining that the highest prospective dominant user value fails to be above a threshold:
rotating the display to a default position;
determining a percentage of faces of the set of local users that are visible from the display;
determining a percentage of voices of the set of users that are audible from the display;
computing a threshold based on the percentage of faces and the percentage of voices; and
maintaining the display in the default position until at least one of the set of prospective dominant user values reaches the threshold.

15. The information handling system of claim 9 wherein the processors perform additional actions comprising:
retrieving a predetermined schedule that comprises a set of presenters in a presentation order;
matching each of the set of local users to the set of presenters; and
determining that the first local user matches a first one of the set of presenters based on the presentation order.

16. The information handling system of claim 15 wherein the processors perform additional actions comprising:
receiving an indication to select a different one of the set of local users based on the predetermined schedule;
in response to receiving the indication to select the different user, identifying a second one of the set of local users that matches a second one of the set of presenters based on the presentation order; and
rotating the display to the second local user.

17. A computer program product stored in a computer readable storage medium, comprising computer program code that, when executed by an information handling system, causes the information handling system to perform actions comprising:
initiating a video conference between a set of local users and one or more remote users, wherein the set of local users is located in a physical area and views one or more video feeds of the one or more remote users on a display;
identifying a distance from the display to each one of the set of local users, resulting in a set of distances;
determining a voice level of each one of the set of local users, resulting in a set of voice levels;
computing a set of prospective dominant user values for each of the set of local users based on their corresponding one of the set of distances and one of the set of voice levels;

selecting a first one of the set of local users based on the set of prospective dominant user values; and positioning the display based on a location of the first local user in the physical area.

18. The computer program product of claim 17 wherein the information handling system performs further actions comprising:

detecting a change in the location of the first local user in the physical area; and rotating the display based on the change in the location of the first local user.

19. The computer program product of claim 18 wherein the information handling system performs further actions comprising:

determining a preferred viewing angle of the display, wherein the preferred viewing angle is an angle at which the first local user prefers to view the display; and maintaining the preferred viewing angle to the first local user during the rotating of the display.

20. The computer program product of claim 17 wherein the information handling system performs further actions comprising:

assigning the first local user as a dominant user in response to determining that the first local user has a highest one of the set of prospective dominant user values;

computing a set of new prospective dominant user values for each of the set of local users based on a set of new distances and a set of new voice levels corresponding to the set of local users;

assigning a second one of the set of local users as a new dominant user in response to determining that the second local user has a highest new prospective dominant user values; and rotating the display to the second local user.

* * * * *